Oct. 15, 1968  A. E. MARTENS  3,406,309
REVERSIBLE SEMICONDUCTOR DIRECT CURRENT MOTOR DRIVE CIRCUIT
Filed Dec. 31, 1964

INVENTOR
ALEXANDER E. MARTENS
BY Arthur L. Nelson
Frank C. Parker
ATTORNEYS

United States Patent Office 3,406,309
Patented Oct. 15, 1968

3,406,309
REVERSIBLE SEMICONDUCTOR DIRECT CURRENT MOTOR DRIVE CIRCUIT
Alexander E. Martens, Greece, N.Y., assignor to Bausch & Lomb Incorporated, Rochester, N.Y., a corporation of New York
Filed Dec. 31, 1964, Ser. No. 422,638
7 Claims. (Cl. 314—75)

ABSTRACT OF THE DISCLOSURE

A motor drive circuit is disclosed for reversibly driving a direct current motor. The field winding of the motor is energized by a direct current potential. The armature circuit is energized from an alternating current source. A pair of semiconductor amplifying devices are connected in series with the armature and the alternating current source through undirectional current conduction devices. The amplifying devices, when rendered conductive, conduct during opposite polarities of the alternating current source to allow current flow through the armature in opposite directions providing for reversible motor operation.

---

This invention relates to an electrical control system and more particularly to a null balancing DC servo-system.

Null balancing servo-systems have many applications in control and instrumentation, for example in recording instruments, aircraft control systems, automatic machinery and others. Most widely used are null balancing servo-systems utilizing 60 or 400 c.p.s. carrier frequently and inductive AC motors, responsive to phase and amplitude changes as prime movers.

In many instances however, it is advantageous to use a null balancing DC servo-system incorporating a DC shunt motor because each system generally has higher efficiency, because of overall system requirements, or because only DC power is available and generation of suitable AC power is not desirable. One of the reasons that DC servo-systems are not as generally accepted as AC servo-systems is the difficulty presented by requirement for reversal of rotation sense of the motor shaft in response to the change in polarity of the input signal.

Such reversal can be accomplished by either reversing the connections to the field or armature or in some other way reversing the flow of the current through armature or field.

To make a DC servo-system wholly useful the reversal of rotation should be smooth and with a minimum of dead-zone, such that the system will be sensitive to small signals varying their polarity about zero, as it is the case with error signals generated in a null balancing servo-system.

Accordingly, this invention provides two novel means for automatically reversing the sense of rotation of a DC motor response to the change in polarity of the input signal without use of relays, switches or any other auxiliary polarity responsive equipment.

It is an object of this invention to provide a null balancing DC servo-system.

It is a further object of this invention to provide a null balancing DC servo-system utilizing transistors.

It is a further object of this invention to provide a null balancing DC servo-system having a balanced differential input with respect to common ground.

It is a further object of this invention to provide an alternate null balancing DC servo-system having a single unbalanced input with respect to common ground.

The objects of this invention are accomplished by providing two alternate transistorized systems which change the magnitude and direction of the direct current flowing through the armature of a DC motor, responsive respectively to changes in magnitude and polarity of the input DC signal, thereby controlling the speed and/or torque as well as direction of rotation of the motor shaft.

An illustration of application of this invention is in an automatic carbon arc illuminator.

The arc forms one leg of a Wheatstone bridge. The voltage across two opposite corners of this bridge varies in magnitude and polarity with the change in DC current feeding the arc. These voltage changes are sensed by one version of the circuit here described and cause a DC shunt motor to increase or decrease the spacing between the carbon electrodes, hence maintaining the arc-current at a constant value.

Another illustration of application of this invention is in maintaining constant tension on film, paper, textiles or wire being transferred from a feed drum into takeup drum. Here DC-torque motors are frequently used to maintain the desired tension.

The tension is measured and expressed in form of an electrical error signal indicating the deviation from the preset value. One way to obtain such signal is to use a mechanical spring-loaded arm touching the material under tension. The position of the arm changes—responsive to changes in tension. This motion is transmitted to a potentiometer which in turn generates DC voltage of magnitude and polarity corresponding to the deviation. The error signal is transformed into corrective shaft motion of the DC torque motors by the system object of this invention. The use of this system insures smooth control through zero and allows utilization of the efficient DC motors.

The preferred embodiments of this invention are disclosed in the attached drawings and described in the specificatoin.

Figure 1:
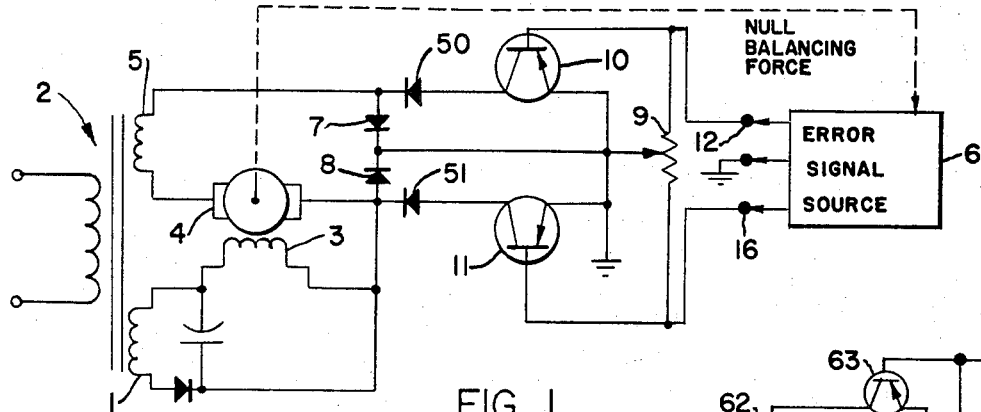
FIG. 1 is an electrical diagram of the null balancing DC servo-system having a differential input.
Figure 4:
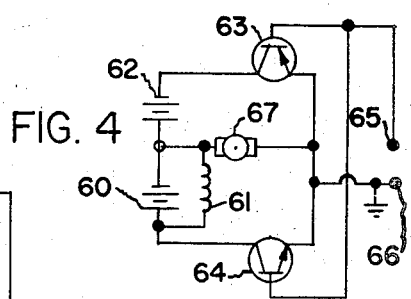
FIG. 4 is a modification of the circuit shown in FIG. 2 showing use of batteries for energization.
Figure 2:
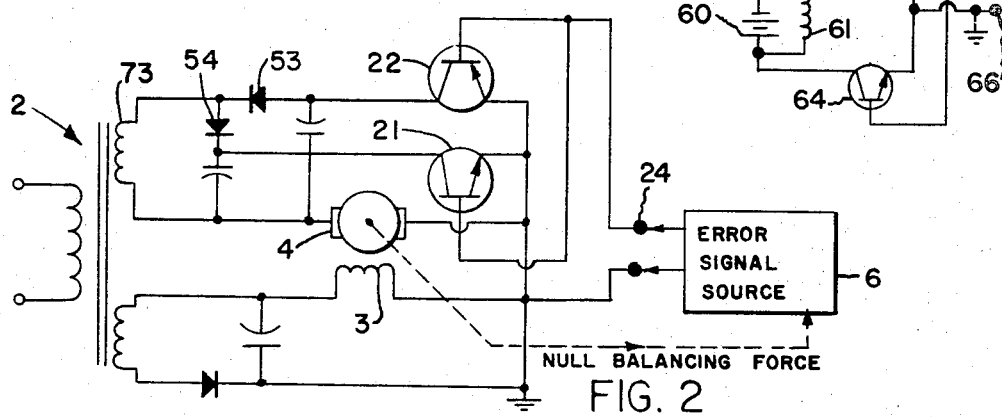
FIG. 2 is a modification of the null balancing DC servo-system having a single-ended input.
Figure 3:
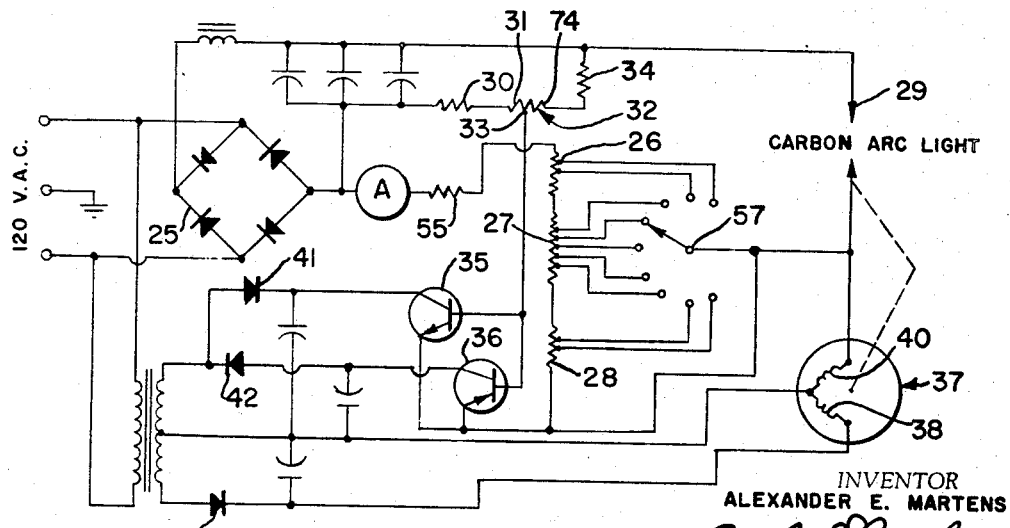
FIG. 3 is a modification of a system illustrated in FIG. 1 adapted for use in combination with a carbon arc light.

The systems shown in FIGS. 1, 2 and 3 derive their power through suitable power supplies from AC power lines. This, however, does not imply the exclusive mode of operations: a suitable DC power source such as a battery is shown in FIG. 4.

FIG. 1 illustrates a servo motor having constant energization of field 3 from the secondary winding 1 in transformer 2. The primary winding of transformer 2 is connected to a suitable source of alternating current. The armature of the motor 4 is energized by the secondary winding 5 which is connected to a rectifier circuit. The rectifier circuit passes half-wave rectified DC-current through armature 4 with polarity and magnitude depending on the unbalance of the error signal source 6. The rectifier circuit includes the diodes 7 and 8 connected in reverse polarity across the secondary winding 5 through the armature of the motor 4. A center tap at the junction intermediate the diodes 7 and 8 is connected to ground and a contact point on the adjusting potentiometer 9. The ground connection is also connected to the emitters of the transistors 10 and 11. The collectors of the transistors 10 and 11 are connected respectively through the diodes 50 and 51 to the secondary winding 5. The transistors 10 and 11 are PNP type transistors, however, NPN type transistors could be used by merely rearranging the circuit. The base of transistor 10 is connected through the junction 12 to the error signal source 6. The base of the transistor 11 is connected through the junction 16 to the error signal source 6.

FIG. 2 illustrates a transformer 2 for energizing the field 3 and armature of the servo motor 4. The field winding 3 is energized at a constant value. The armature of motor 4 is connected in a rectifier circuit and the direction of rotation is controlled by the bias voltage placed on the transistors 21 and 22. Both of the transistors are connected to a common junction 24. The transistor 21 is a NPN transistor and the transistor 22 is a PNP transistor. The direction and magnitude of current flow is controlled by the polarity and magnitude of the voltage at the junction 24 which is applied to the bases of both transistors 21 and 22.

FIG. 3 illustrates a null balancing servo system operating off a bridge rectifier 25 which supplies the voltage for the Wheatstone bridge. The resistors 55, 26, 27 and 28 form one of the legs of the Wheatstone bridge circuit, which is connected in series with the carbon arc light 29, the second leg of this bridge, across the output of rectifier 25. The carbon arc light may be replaced with a variable impedance transducer suitable for control purposes. The other two legs of the bridge circuit are the resistance 30 and the portion 31 of the potentiometer 32 which is connected in series with the leg which is formed by the remaining portion 74 of the potentiometer 32 on the opposite side of the contact arm 33 in series with resistor 34. The unbalance of the Wheatstone bridge is sensed by the contact arm 33 on the potentiometer 32 and applied to the bases of transistors 35 and 36.

The motor 37 has a field winding 38 which is energized by a half-wave rectifier circuit including the diode 39. The armature 40 is connected through the rectifier circuit including diodes 41, 42 which are connected respectively in common polarity with their mating transistors 35 and 36. Energization of the armature 40 is controlled by the bias placed on the bases of the transistors 35 and 36.

FIG. 4 illustrates a modification of FIG. 2 wherein two batteries are used to energize the circuit. The battery 60 energizes the field 61. The battery 62 is connected in series with battery 60. The emitter of PNP transistor 63 and the emitter of NPN transistor 64 are both grounded. The bases of transistors 63 and 64 are connected to the terminal 65 which receives the error signal from an error signal source similar to that shown in FIG. 2. The terminal 66 which is also connected to the error signal source is grounded.

Accordingly when no signal is present on terminal 65 and the bases of transistors 63 and 64 the transistors are cut off. When the signal on terminal 65 is negative the transistor 63 is conducting and the current flows through the armature of the motor 67 causing a rotation of the motor which in turn generates a null balancing force from the motor 67 to the error signal source. The motor drives the error signal source to a null positon and the signal at terminal 65 returns to zero.

When the signal at terminal 65 is positive the transistor 64 is conducting and the current flows through the armature of the motor 67 in a reverse direction to that when transistor 63 is conducting. The reverse direction of the motor causes a null balancing force to restore the error signal source to zero signal output. The direction of the motor rotation is thereby controlled by the instantaneous state of the transistors 63 and 64 which determines the direction of current flow through the motor armature. The field 61 is energized by the battery which is a constant source of energization.

Referring to the circuit in FIG. 1 the circuit operates in the following manner. When the error signal from the error signal generator 6 is zero the potentiometer 9 is adjusted to the desired operating point. Under these conditions neither transistor 10 or 11 is conducting and the armature 4 is not turning. When a negative error signal is present on terminal 16 the transistor 11 turns on, while transistor 10 remains cut off. This causes current to flow from winding 5 through the diode 7, the transistor 11, the diode 51 and the armature 4. The motor rotates thereby generating a null balancing force which is applied to the error signal source to restore its original zero output.

When a signal of negative polarity is present on the terminal 12 transistor 10 is turned on while transistor 11 is cut off. The current from the winding 5 flows through the armature of motor 4, the diode 8, the transistor 10, and the diode 50. With the current flowing in the opposite direction of the armature of motor 4 the rotation of the motor is reversed thereby causing a null balancing force in the reverse direction to restore the error signal source to a zero output.

The base currents in the transistors are determined by the magnitude of the error voltage and the value of the potentiometer 9. The sensitivity of the circuit may be increased by interposing a differential amplifier between the error signal source 6 and the driver circuits.

The field winding 3 is energized by the rectifier circuit which provides constant level of energization. To provide a large starting torque the field may be incorporated into the control loop in series with the armature of motor 4. Starting current limiting in this case is provided by transistors 10 and 11.

Referring to FIG. 2 in which the configuration is the same as FIG. 1 but the error signal is applied through the terminal 24 to the bases of both transistors 21 and 22 which are a matched pair of PNP, NPN power transistors. The emitters are connected to ground.

The transistors 21 and 22 are normally cut off. Depending on the polarity of the error signal from the error signal source 6 with respect to ground either transistor 21 or 22 is turned on while the other transistor remains cut off. The direction of current flow and hence the sense of rotation of the armature of motor 4 are determined by the instantaneous state of the transistors 21 and 22. If transistor 22 is on, current flow is through the secondary winding 73 of transformer 2, the armature of motor 4, the transistor 22 and the diode 53. If transistor 21 is on, current flows in the opposite direction through the diode 54, transistor 21, and armature of motor 4. The sensitivity of this system also can be increased by using the same method as described for FIG. 1.

The system as shown in FIG. 2 may be modified to that shown in FIG. 3 to provide an automatic carbon arc electrode drive for a carbon arc light. Hence the carbon arc light 29 and the resistances 55, 26, 27 and 28 form two legs of a bridge circuit. The resistor 30, potentiometer 32 and resistor 34 form the other two legs of the bridge circuit. Current through the arc light 29 which controls the brightness of the light, can be adjusted in steps by switching the switch 57. Since the arc light can exhibit the property of negative resistance i.e., a decrease of current with an increase of voltage drop across it, power resistors 55, 26, 27 and 28 are selected to always have greater resistance than the arc light for any current or spacing within a specified range. This insures stability of operation and uniformity of discharge. The error signal is generated between the wiper of potentiometer 30 and the wiper of the switch 57. The error signal is proportional to deviation from the selected current valve flowing through the arc due to burning off of the arc electrodes. The motor changes the spacing of the electrodes to restore the preset current hence reducing the error voltage to zero.

FIG. 4 illustrates a circuit which operates in a manner as described in FIG. 2 and it is assumed that a restoring force from motor 4 may be used to restore the error signal source output to zero in response to motor rotation of motor 67. The diodes are eliminated from the circuit and the circuit operates from a conventional battery.

The preferred embodiments of this invention have been illustrated and described and it is understood that other embodiments might be devised which would fall within the scope of this invention as defined by the claims.

I claim:

1. A null balancing DC servo system comprising, an error signal source having a balanced electrical circuit and means for balancing said circuit to provide a zero output signal, a DC motor having a rectifier circuit for energizing said motor, a control circuit including a matched PNP type transistor and an NPN type transistor having their bases connected to the output of said error signal source, said transistors controlling flow of current through the armature of said motor responsive to the magnitude and polarity of the signal from the error signal source, said motor rotating in the direction responsive to the flow of current through said armature and thereby correcting the unbalance in the error signal source and restoring the balance condition and reducing the error signal output to zero.

2. A null balancing servo system comprising, a Wheatstone bridge having means for energization, a transducer forming one leg connected in series with a resistor forming a second leg across said means for energization, a PNP and a NPN transistor connected for alternate conduction each having its base connected to the junction intermediate said transducer and said resistor, a motor having energizing means and means to control the impedance of said transducer, a diode connected in series with each transistor and the armature for alternate current conduction through said armature of said motor from said second energizing means to thereby provide current flow through the armature of said motor in response to the unbalance in said bridge circuit and thereby provide a restoring force to rebalance said bridge.

3. A null balancing servo system comprising, a Wheatstone bridge having energizing means, a carbon arc light forming one leg of said Wheatstone bridge connected in series with a second leg of said bridge circuit across said energizing means, a motor mechanically connected to said carbon arc light for controlling electrode spacing, two transistors having their base connected to a junction at the opposite corner of said Wheatstone bridge, a diode connected in series with each one of said transistors through said armature to a second source of energization, said diode connected for alternate forward or reverse current conduction through said armature in response to the magnitude and polarity of unbalance of said bridge circuit applied to the bases of said transistors and thereby provide a restoring force from said motor to maintain constant spacing of the electrodes of said carbon arc light.

4. A null balancing servo system comprising, a Wheatstone bridge having means for energization, a carbon arc light forming a first leg of said Wheatstone birdge in series with a resistive element forming a second leg in said bridge circuit, a pair of matched PNP and NPN transistors having their bases connected to the junction intermediate said resistive element and said carbon arc light controlling current in a motor for maintaining the spacing in the electrodes in said light, a second source of electrical energy for energizing said motor through a diode connected in series with the PNP transistor and a second diode connected in reverse polarity with the NPN transistor thereby providing current conduction responsive to the magnitude and polarity of unbalance in said bridge circuit and restoring the original balanced condition of said bridge circuit by operation of said motor.

5. A motor drive circuit comprising:
a direct circuit motor including an armature and a field winding;
first circuit means for energizing said field winding with a direct current potential;
second circuit means for providing an alternating current energizing potential;
a pair of semiconductor amplifying devices each including first and second electrodes defining a controllable current path therebetween and a control electrode for controlling the current flow;
third circuit means including unidirectional current means connecting the first and second electrodes of ones of said amplifying devices in a series circuit with said second circuit means and said armature for current flow through said armature in a first direction when the alternating current potential is of a first polarity;
fourth circuit means including unidirectional current means connecting the first and second electrodes of the other of said amplifying devices in a series circuit with said second circuit means and said armature for current flow through said armature in a direction opposite said first direction when the alternating current is of a second polarity, and
input circuit means coupled to the control electrodes of said pair of amplifying devices so that said amplifying devices are selectively rendered conductive to drive the armature for rotation in either direction.

6. A motor drive circuit comprising:
a direct current motor including an armature and a field winding;
first circuit means for energizing said field winding with a direct current potential;
second circuit means for providing an alternating current energizing potential;
a pair of transistors of opposite conductivity types, each including collector, emitter, and base elecrodes;
third circuit means including a unidirectional current conductng device for connecting the collector and emitter electrodes of one of said transistors in a series circuit with said second circuit means and said armature for current flow through said armature in a first direction when the alternating current potential is of a first potential;
fourth circuit means including a unidirectional current conduction device for connecting collector and emitter electrodes of the other of said transistors in a series circuit with said second circuit means and said armature for current flow through said armature in a direction opposite said first direction when the alternating current is of a second polarity, and
input circuit means coupled to the base electrodes of said pair of transistors so that said transistors are selectively rendered conductive to drive of the armature for rotation in either direction.

7. A null balancing servo system comprising:
a bridge circuit having a transducer forming at least a portion of one leg of said bridge circuit;
means for balancing the bridge circuit;
first circuit means for energizing said bridge circuit;
a direct current motor including an armature and a field winding;
means coupling said armature to drive said means for balancing said bridge circuit;
second circuit means for energizing said field winding with a direct current;
third circuit means for providing an alternating current energizing potential;
a pair of semiconductor amplifying devices each including first and second electrodes providing a controllable current path therebetween and a control electrode for controlling the current flow;
fourth circuit means including unidirectional current means connecting the first and second electrodes of one of said amplifying devices in a series circuit with said third circuit means and said armature for current flow through said armature in a first direction when the alternating current potential is of a first polarity;
fifth circuit means including unidirectional current means connecting said first and second electrodes of the other ones of said amplifying devices in a series circuit with said third circuit means and said armature for current flow through said armature in a direction opposite said first direction, when the alternating current is of a second polarity, and sixth circuit means coupling said bridge circuit to the control electrodes of said first and second amplifying devices so that said motor drives said means for balancing said bridge circuit to a balanced condition.

References Cited

UNITED STATES PATENTS 3,246,222  4/1966  Ogawa et al. ----- 318—20.835

BERNARD A. GILHEANY, *Primary Examiner.*

R. N. ENVALL, *Assistant Examiner.*